INVENTOR
JOSEPH B. SMITH
BY
McNENNY, FARRINGTON, PEARNE, & GORDON
ATTORNEYS

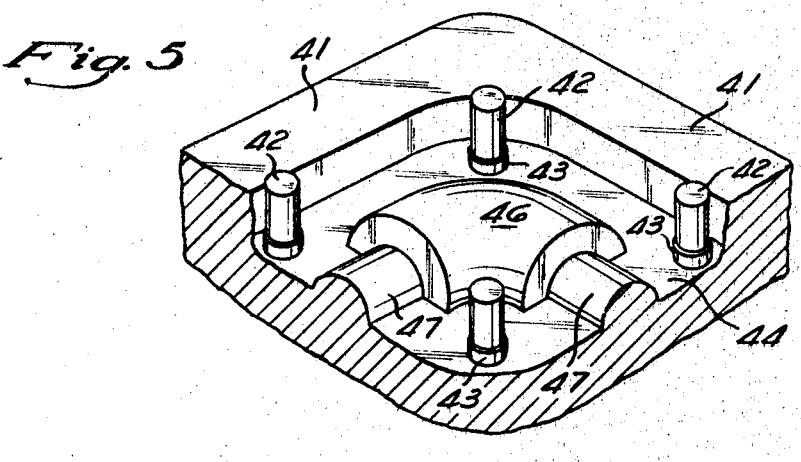
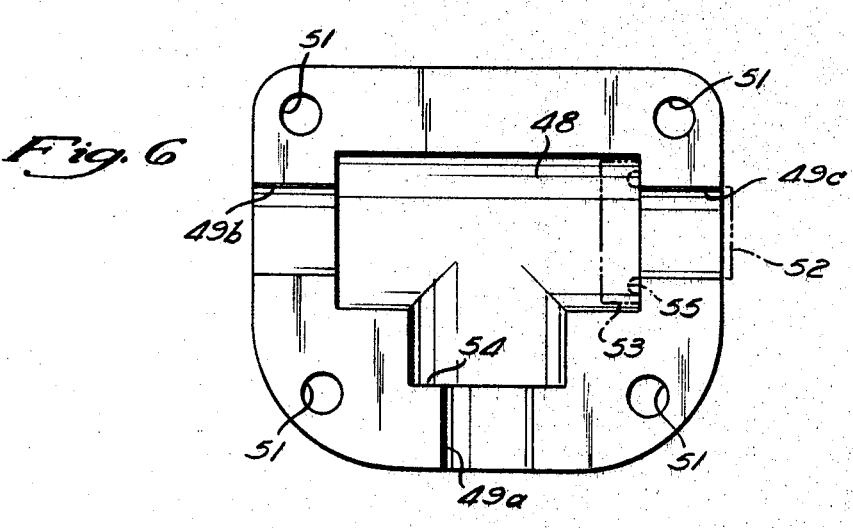
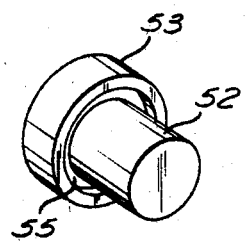

United States Patent Office 3,517,701
Patented June 30, 1970

3,517,701
REPAIR FITTING
Joseph B. Smith, % The Pipe Line Development Co., 1831 Columbus Road, Cleveland, Ohio 44113
Filed Apr. 8, 1968, Ser. No. 719,537
Int. Cl. F16l 55/18, 23/00
U.S. Cl. 138—97      11 Claims

ABSTRACT OF THE DISCLOSURE

A pipe repair fitting is disclosed which includes flanged fitting halves, each consisting of a rigid metal body and an elastomeric sealing material bonded thereto. The two halves are proportioned so that, when assembled, the sealing material along the flanges cooperates with the sealing material along spaced pipe clamping zones to completely close a chamber proportioned to loosely enclose the leaking portion of the pipe. In the illustrated embodiments the chamber is proportioned to enclose a pipe fitting such as an elbow, a T, or a straight coupling. In one embodiment a single assembly may be used to selectively repair leaks at a T, an elbow, or a straight coupling by selectively positioning a separate plug element in the assembly when the pipe being repaired joins only two pipes. The disclosed method of forming the coupling halves includes molding the elastomeric sealing material to the fitting half body while the body is positioned in a pattern and curing the sealing material while the body is so positioned.

BACKGROUND OF THE INVENTION

This invention relates generally to pipe fittings and more particularly to a novel and improved repair fitting adapted to be easily installed in an existing piping system to close and seal a break, leak, or the like.

When a piping system develops a leak, it is often difficult and time-consuming to repair or replace the leaking parts, particularly when the leak develops at a location in the piping system remote from the unions. In the past it has been customary to dismantle the piping system from the unions back to the area of the leak so that the leaking element could be removed. Such disassembly and reassembly of the system in many instances required considerable time and expense, and further required that the system be shut off during the entire repair period. Also, in the case of older piping systems, other pipe and fitting elements were often damaged during the assembly and disassembly. This has often made it necessary to replace a considerable part of a system.

PRIOR ART

Various types of fittings have been proposed which are adapted to be clamped over a leak in a piping system to close the leak without disassembling the piping system. In most instances such repair fittings have utilized strips of gasket material to seal with the pipe on opposite sides of the leak. These strips of gasket material, in order to function properly, must be positioned with accuracy and have, therefore, required extreme care during installation to insure proper sealing. Further, if the pressure remains on the line while the fitting is applied, considerable difficulty is normally encountered in maintaining the proper position of the elements as the elements are clamped in the assembled position.

In other fittings which have been proposed it is necessary to position a loose piece of sealing material around the leak and then clamp the material in position. Here again difficulty in properly positioning the sealing material has been encountered, particularly when the line is under pressure during the repair. An example of this latter form of repair fitting is disclosed in the United States Letters Pat. No. 2,440,864.

SUMMARY OF INVENTION

A repair fitting incorporating the present invention includes two similar fitting halves which are adapted to be clamped against opposite sides of a pipe to close a leak, break, or the like. Each half includes rigid body, preferably formed of metal, and an elastomeric sealing material bonded to the body. The two halves are formed with flanges through which bolts may be inserted to clamp the two halves in position around the leak. The faces of the sealing material, along with flanges, are clamped into tight engagement to form a fluid-tight joint therebetween and the two halves are provided with spaced clamping zones which encircle and grip the pipe on opposite sides of the leak. Because the sealing material is bonded to the associated body, there is no difficulty in properly positioning the assembly during the installation. Further, the bolts extending through the flanges properly align the fitting halves with respect to each other so that the fitting can be installed even when the piping is under pressure.

In the illustrated embodiment the two fitting halves are cast ductile iron and the sealing material is a silicone rubber. The halves are formed so that spaced clamping zones are provided which tightly encircle the pipe on opposite sides of the leak or break when the fitting is assembled and so that the surface of the rubber along the flanges is tightly clamped together. The clamped flange surface cooperates with the clamping zones to completely enclose a recess or chamber, defined by the two halves. This chamber is proportioned to loosely receive a normal pipe fitting.

The preferred embodiment of this invention is formed by molding the elastomeric sealing material to the metal body by positioning the body in a pattern with the elastomeric material while such material is in a fluid state and thereafter curing the elastomeric material in place against the body. When the body is properly cleaned a sufficient bond is provided between the elastomeric material and the body to form a permanent assembly and the molding procedure automatically compensates for variations in the dimensions of the body. The fitting may be shaped to fit over an elbow, a T, a straight coupling, or a union. Further, if desired, the fitting may be sized to grip and seal two or more sizes of pipe.

In accordance with one illustrated embodiment of this invention, a fitting is provided with a shape to accommodate a T and is supplied with a flanged plug which may be used to selectively plug any one of the openings in the fitting. With this embodiment a single fitting may be used to repair an elbow, a T, or a straight coupling. When used to repair a coupling or an elbow, the plug is placed in the unused opening. When used to repair a T, the plug is discarded.

OBJECTS OF INVENTION

It is an important object of this invention to provide a novel and improved repair fitting which may be installed on existing piping to repair a break or leak in such piping without requiring that the pressure in the piping be relieved.

It is another important object of this invention to provide a novel and improved repair fitting for existing piping which includes two similar flanged halves, each of which comprises a rigid body with a formed elastomeric sealing material bonded thereto so that the fitting can be easily installed in an existing piping system.

It is still another object of this invention to provide a novel and improved repair fitting according to the last preceding object wherein the elastomeric sealing material completely encloses the portion of the piping within the fitting when the fitting is installed.

It is another important object of this invention to provide a novel and improved repair fitting according to any of the preceding objects wherein elastomeric sealing material is molded in place on a metal body member.

It is still another object of this invention to provide a novel and improved repair fitting according to any of the preceding objects wherein a single fitting assembly can be used to repair elbows, T's, and couplings.

Further objects and advantages will appear from the following description and drawings wherein:

FIG. 5 is a fragmentary perspective view, partially in section, of one form of pattern which may be used to mold the elastomeric material;

FIG. 6 is a side elevation of a fitting half in accordance with another embodiment of this invention wherein a single assembly may be used to repair an elbow, a T, or a straight coupling; and, FIG. 7 is a perspective view of a plug for use with the fitting of the type illustrated in FIG. 6.

Figure 1:
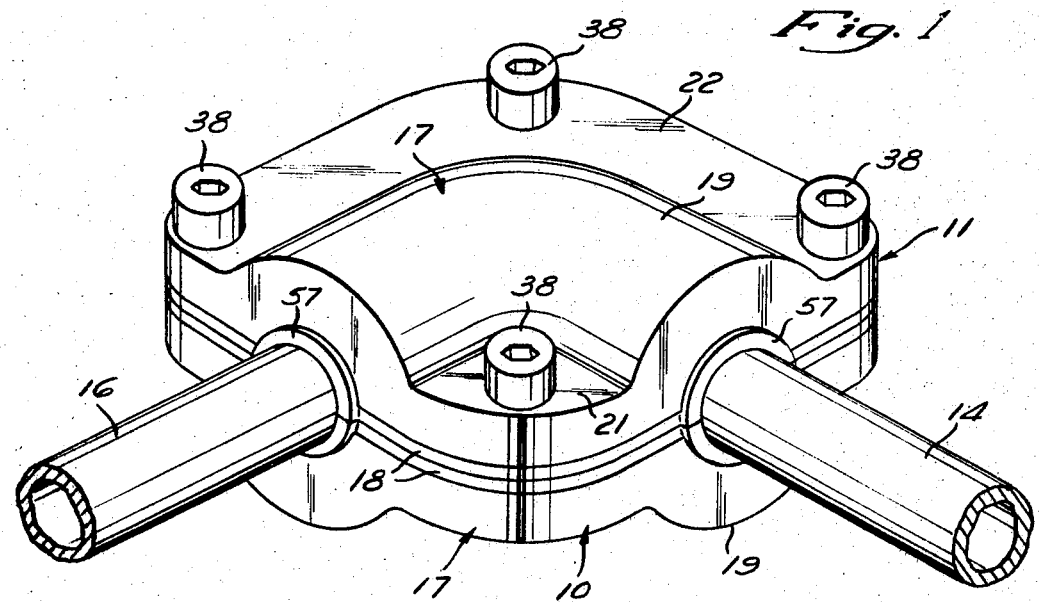
FIG. 1 is a perspective view of a repair fitting incorporating this invention shown in its installed position to repair a leak at an elbow.

Referring to FIGS. 1 through 4, a repair fitting for an elbow includes two similar fitting halves 10 and 11. This fitting is illustrated installed around an elbow 12 of the usual type which has two pipes 14 and 16 threadedly connected thereto. The fitting is normally formed to fit over a pipe fitting since leaks tend to occur at the joint at the pipe fitting due to stress concentrations and the like. However, a repair fitting for use over a straight coupling can be used to repair a leak in a straight piece of pipe intermediate its ends.

The two fitting valves 10 and 11 are similar in shape and include a rigid body 17 with an elastomeric sealing material 18 molded and bonded thereto. The illustrated body is cast from ductile iron, but it may be formed of other suitable materials and by other suitable methods such as stamping or the like. The body is formed with an arcuate section 19, which in the first embodiment is in the form of an L and flanges 21 and 22 extend from opposite sides thereof. The inner faces of the bodies 17 are formed with an arcurate recess 23 along the arcurate section 19 which are proportioned to cooperate to define a chamber sufficiently large to receive the elbow 12 with clearance even after the sealing material 18 is applied. Extending from the two ends of the arcurate recess 23 are semicylindrical grooves 24 which are joined to the recess 23 by end walls 26.

The elastomeric sealing material 18 is bonded to the body 17 along the entire surface of the recess 23, end walls 26, semicylindrical grooves 24, and the flanges 21 and 22. Preferably the wall thickness of the sealing material when unstressed is substantially uniform along the entire surface of the body. In one preferred embodiment the elastomeric sealing material 18 is molded in place against the body by use of a pattern as described in more detail below. The exposed surface of the sealing material 18 provides an arcurate generally semicylindrical recess 27 joined to semicylindrical clamping grooves 28 by a radially extending end wall 29 and flat flange clamping surfaces 31 along both of the flanges 21 and 22.

The two recesses 27 of the two fitting halves cooperate with the end walls 29 to define a chamber 32 which completely encloses the elbow 12 with clearance when the two halves are clamped together. The flange surfaces 31 also abut and from a sealed joint which cooperates with a sealed joint against the two pipes 14 and 16 to completely close the chamber 32. Therefore, any leak or break within the chamber 32 is completely sealed by the assembled fitting.

In the illustrated embodiment the flanges 22 of the fitting half 11 are formed with three clearance bolt holes 33 and the flange 21 of the fitting half 11 is formed with a clearance bolt hole 34. The fitting half 10 is formed with three threaded bolt holes 36 aligned with the holes 33 and a single threaded bolt hole 37 aligned with the hole 34. When the fitting is assembled, the two halves are positioned on opposite sides of the pipe and bolts 38 are threaded into each of the bolt holes and tightened to clamp the two halves together. With this arrangement, utilizing tapped holes in one of the halves instead of bolts and nuts, the fitting can be assembled in a location where only one side of the coupling is accessible for tightening the bolts.

In the preferred embodiment of this invention, the silicone rubber is provided with a durometer of about 50 to 60 on the Shore A scale and the various elements are proportioned so that the rubber along the clamping zones 28 is clamped around the pipes 14 and 16 so that its thickness is reduced to about two-thirds of its unstressed thickness. In actual tests it has been found that two-inch fittings proportioned in this summer are capable of sealing high pressures in the order of 1000 pounds per square inch and that the fitting provides sufficient gripping on the pipes 14 and 16 so that the pipes will not blow off even if a full break occurs between the fitting 12 and one of the pipes. Further, with such proportions it has been found that the rubber flows into and fills the sealing. It is preferable also to arrange the proportions threads of the pipe to provide increased gripping and so that the axial length of the gripping zone is approximately equal to or greater than the diameter of the pipe being clamped. With such proportions, a firm clamping of the pipe is insured and racking or vibration of the system does not cause failures. Still further, it is preferable to proportion the parts so that the length of the gripping zone, aligned with the pipe is at least about four times the unstressed thickness of the rubber. This length tends to minimize the tendency of the rubber to extrude out of the fitting when the pipes are pressurized.

FIG. 5 illusrates one type of pattern which may be used to mold the sealing material 18 directly to the body 17 of the fitting half. This pattern includes side walls 41 which closely fit the edges of the body 17 and dowel pins 42 which project through the bolt holes. Adjacent to the lower face 44 of the pattern, the dowel pins are formed with collars 43 which automatically space the flanges of the body from the bottom wall 44 of the pattern to insure that the sealing material will be of the proper thickness. Projecting up from the bottom wall 44 the pattern is provided with a male arcuate section 46 which forms the recess and semicylindrical extensions 47 which form the clamping zones. With this pattern a good finish and accurate tolerances are achieved by merely positioning a body 17 in the pattern with uncured fluid silicone rubber material therebetween. Obviously, suitable vent holes should be provided to insure that the cavity formed between the pattern and the body is completely filled. The rubber material is then cured a sufficient amount so that it holds its shape before the body and pattern are separated. In practice it has been found that an effective bond is obtained between the silicone rubber and the ductile iron, without the use of separate adhesive, when the body is cleaned by sand blasting before it is placed on the pattern. It should be understood that any suitable method of molding may be utilized and that the pattern illustrated and the particular molding procedure described is given by way of example of one preferred procedure which may be used. It should also be understood that other elastomeric materials may be used as long as they are compatible with the fluid carried by the pipe and do not deteriorate under the temperatures encountered. Silicone rubber is given by way of a single example of a satisfactory material for most uses.

FIGS. 6 and 7 illustrate a second embodiment of the invention wherein a single fitting assembly can be selectively used to repair an elbow, a T, or a straight coupling. In this embodiment the two fitting halves are again formed of a base with a sealing material molded thereto. However, the base and sealing material are shaped so that a T-shaped recess 48 is formed in the half and three clamping zones 49a, 49b, and 49c extend from the recess. Because of its shape, there are three flanges provided with suitably located bolt holes 51 so that the two fitting halves can be clamped together in the manner described above.

When the fitting is to be used to repair a leak at a T, the two halves are bolted together with one of the pipes positioned in each of the clamping zones. However, when the fitting is used to repair a straight through coupling, a a flanged plug 52 is positioned in the opening defined by the clamping zones 49a with the flange 53 positioned adjacent to the end wall 54 of the two halves. The pipes then extend through the recesses 49b and 49c which clamp the pipes and in cooperation with the plug 52 form a sealed assembly. The flange 53 prevents the plug from falling out during the assembly and assist in preventing it from blowing out when the fitting is pressurized. Preferably the flange is undercut at 55 to provide clearance for the bulge of rubber caused by clamping deformation of the rubber along the clamping zone.

When the fitting of FIG. 6 is to be used to repair a leak at an elbow, the plug is positioned in one of the openings defined by the clamping zones 49b or 49c. In that event the fitting grips the pipes at the other two unplugged openings.

Figure 3:
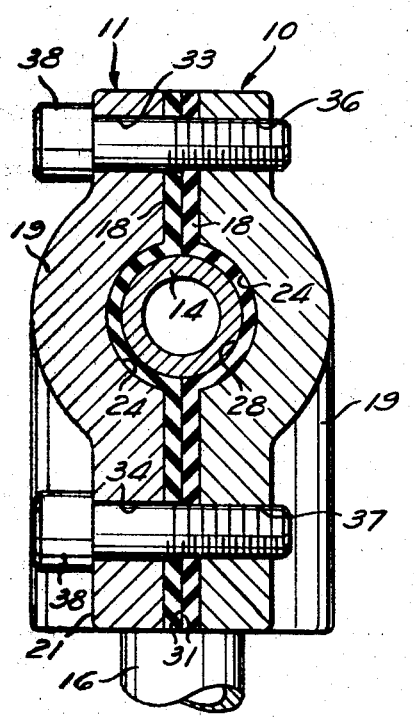
FIG. 3 is a cross section through one of the clamping zones with a plane of the section staggered to include two clamping bolts.
Figure 2:
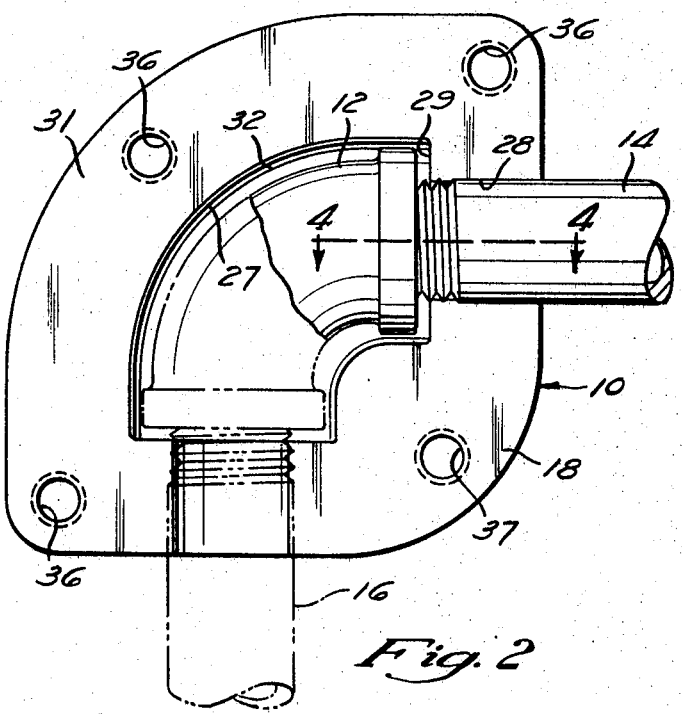
FIG. 2 is a side elevation with one of the fitting halves removed illustrating how the fitting is positioned around an elbow with a portion of the elbow and one connected pipe illustrated in phantom to better illustrate the shape of the cavity within the fitting half.
Figure 4:
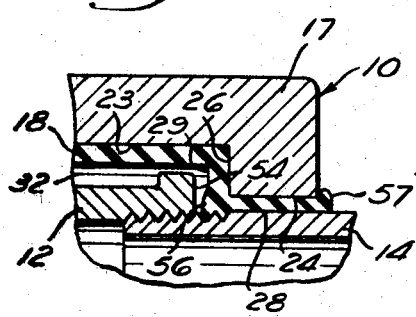
FIG. 4 is a fragmentary section taken generally along 4—4 of FIG. 2.

With either of the embodiments of this invention illustrated, a simple, easily installed, dependable fitting is provided which can be installed over a leak even while the system remains under pressure. There is no difficulty in locating the parts of the assembly during the clamping operation so a permanent and dependable repair is easily accomplished. Since the sealing material in each fitting half completely encloses the area of the leak, there is no danger of the leaking fluid penetrating behind the sealing material and a dependable rubber-to-rubber joint is afforded to seal between the two couplings halves. Preferably the chambers within the coupling halves are proportioned so that the pipe fitting is received in the chamber with clearance. This provides a space between the end wall 54 of the fitting 12 so that a sealing material can bulge inwardly at 56, as illustrated in FIG. 3, as well as outwardly at 57. This also insures that any sharp edges on the pipe fitting will not wear through the sealing material under vibration or the like. Still further, this clearance insures that the pipe fitting does not interfere with the proper clamping along the flanges and clamping zones.

Although preferred embodiments of this invention are illustrated, it is to be understood that various modifications and rearrangements of parts may be resorted to without departing from the scope of the invention disclosed and claimed herein.

I claim:

1. A repair fitting for a pipe coupling having an opening intermediate its ends comprising a pair of similar flanged fitting halves each including a rigid body and an elastomeric sealing material bonded thereto, said halves being proportioned so that when they are clamped together with their flanges abutting the surface of said sealing material abuts along the flanges and provides spaced pipe clamping zones which encircle and grip a pipe on opposite sides of said opening, the interior of said fitting halves bounded by said clamping zones and abutting flanges defining a sealed chamber loosely enclosing said pipe around said opening, said chamber is sized and shaped to entirely enclose a pipe fitting connecting at least two separate pieces of pipe and provided with an end wall adjacent to each connected pipe, and said chamber is provided with a radially extending wall proportioned to extend substantially adjacent to and spaced from each pipe fitting end wall, said body and elastomeric sealing material being formed so that material on each half has a substantially constant thickness throughout the major portion of its extent, and clamping means operable to clamp said flanges together.

2. A repair fitting as set forth in claim 1 wherein each half is formed with a recess which cooperates with the recess of the other half to define a chamber proportioned to loosely enclose a pipe fitting, and said sealing material is molded to fit said recess and completely cover the surface thereof.

3. A repair fitting as set forth in claim 2 wherein said flanges are formed with bolt holes which are aligned when said halves are properly positioned around a pipe, and said clamping means are bolts proportioned to extend through said bolt holes and clamp said halves together.

4. A repair fitting as set forth in claim 2 wherein the unstressed thickness of said elastomeric material is about one-eighth of an inch and the durometer of said elastomeric material is about 50 to 60 on the Shore A scale.

5. A repair fitting as set forth in claim 1 wherein said sealing material along said clamping zones is proportioned so that it is compressed to a thickness no greater than about 2/3 of its unstressed thickness when said halves are clamped around said pipe.

6. A repair fitting as set forth in claim 5 wherein said sealing material is adapted to flow into and seal with threads in a pipe clamped by said clamping zone.

7. A repair fitting as set forth in claim 5 wherein the length of said clamping zone aligned with said pipe is at least four times the thickness of the elastomeric material along said clamping zone.

8. A repair fitting as set forth in claim 7 wherein each half includes a rigid body, and said elastomeric sealing material is molded and bonded to said body along the entire adjacent interface therebetween, said interface being relatively rough and the outer surface of said sealing material along said flanges and clamping zones being substantially smooth than said interface.

9. A repair fitting as set forth in claim 1 wherein each half is formed with two spaced and aligned clamping zones, and a third centrally located clamping zone perpendicular to said two clamping zones, and plug is provided which is proportioned to be selectively positioned in any one of the clamping zones when said halves are clamped together to close the selected opening formed thereby.

10. A repair fitting as set fourth in claim 9 wherein said plug is formed with a radial surface on one end adapted to fit against mating surfaces on said halves to prevent axial movement of said plug out of said fittings.

11. A repair fitting as set forth in claim 10 wherein said plug is formed with an elongated section and said radial surface is radially spaced from said elongated section.

References Cited
UNITED STATES PATENTS

| | | | |
|---|---|---|---|
| 234,799 | 11/1880 | Neely | 138—99 |
| 320,771 | 6/1885 | Ford | 285—373 X |
| 410,816 | 7/1889 | Walker et al. | 285—373 X |
| 793,589 | 6/1905 | Kellogg | 285—15 X |
| 881,022 | 3/1908 | Nailler | 285—373 X |
| 2,440,864 | 5/1948 | Liss | 285—171 |
| 2,700,988 | 2/1955 | Smisko | 285—45 X |
| 2,968,840 | 1/1961 | Morse. | |

FOREIGN PATENTS

| | | |
|---|---|---|
| 666,301 | 7/1963 | Canada. |
| 1,488,423 | 6/1967 | France. |

HERBERT F. ROSS, Primary Examiner

U.S. Cl. X.R.

285—15, 373

PO-1050
(5/69)

UNITED STATES PATENT OFFICE
CERTIFICATE OF CORRECTION

Patent No. 3,517,701   Dated June 30, 1970

Inventor(s) Joseph B. Smith

It is certified that error appears in the above-identified patent and that said Letters Patent are hereby corrected as shown below:

Column 3, line 60, "valves" should read -- halves -- .

Column 4, line 44, "summer" should read -- manner -- .

Column 4, lines 51 and 52 "sealing. It is preferable also to arrange the proportions threads of the pipe to provide increased gripping and " are transposed and should read -- threads of the pipe to provide increased gripping and sealing. It is preferable also to arrange the proportions --

Column 5, line 64 "couplings" should read -- coupling -- .

Claim 8, line 61, "smooth" should read -- smoother -- .

SIGNED AND
SEALED
OCT 13 1970

(SEAL)
Attest:

Edward M. Fletcher, Jr.
Attesting Officer

WILLIAM E. SCHUYLER, JR.
Commissioner of Patents